(No Model.)

J. GARTNER.
SCREW PROPELLER.

No. 274,307. Patented Mar. 20, 1883.

WITNESSES:
Francis McArdle,
C. Sedgwick

INVENTOR:
J. Gartner
BY Munn & Co
ATTORNEYS.

UNITED STATES PATENT OFFICE.

JOHN GARTNER, OF DALLAS, TEXAS.

SCREW-PROPELLER.

SPECIFICATION forming part of Letters Patent No. 274,307, dated March 20, 1883.

Application filed July 18, 1882. (No model.)

*To all whom it may concern:*

Be it known that I, JOHN GARTNER, of Dallas, in the county of Dallas and State of Texas, have invented a new and Improved Screw-Propeller Vessel, of which the following is a full, clear, and exact description.

The object of the invention is to connect propellers on the opposite sides of a vessel with one another and with a stern propeller, so that they will act at the same time upon different parts of the vessel in urging her forward, as hereinafter described.

Reference is to be had to the accompanying drawings, forming part of this specification, in which similar letters of reference indicate corresponding parts in both the figures.

Figure 1:
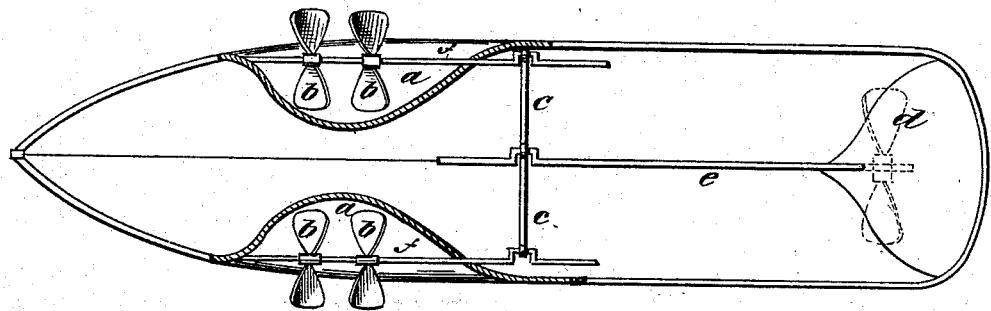
Figure 2:
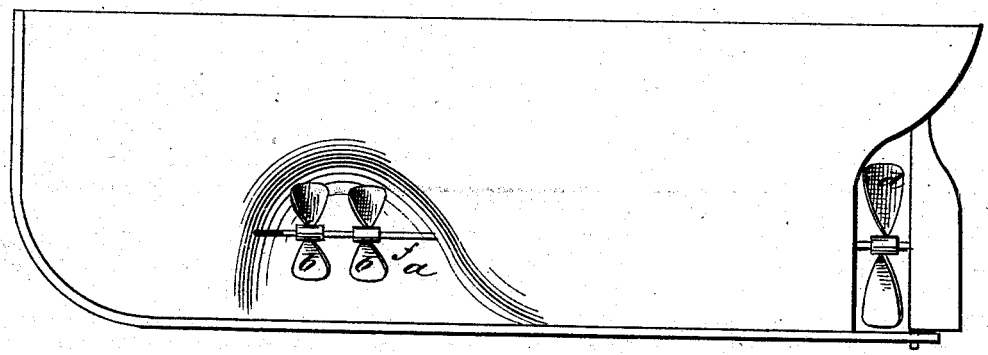

Figure 1 is a horizontal section of a vessel having tandem propellers in the sides and a single screw in the stern, to which the said side propellers are auxiliary; and Fig. 2 is a side elevation of Fig. 1.

I propose to make a recess, $a$, in each side of the hull from a quarter to a third of the ship's length, astern of the bow, and locate therein tandem screws $b$ on a single shaft having bearings each side of the screws in the hull, and sternward thereof, extending through the hull sufficiently for the connecting-rods $c$ to be attached for driving the screws. The screws of the respective sides will be made to revolve in opposite directions to balance the side draft. $d$ represents the stern screw, to be arranged the same as in a single-screw propellers; or twin screws may be used. $e$ represents the ordinary propeller-shaft, which extends along the keel in the usual manner, to which the power is applied, and the side screws, $b$, are connected to it by their rods $c$ as a simple means of applying the power to them. The power may, however, be applied in any other approved way. By extending the shafts $f$ of the auxiliary screws across the recesses $a$ and supporting them in bearings at each end they are enabled to carry two or more screws, according to the length of the recesses, whereby the hold on the water for propelling effect is very largely increased, and the recesses are not required to be so deep on the sides of the vessel for a given area of propelling-surface as when single screws are employed in the sides. By thus re-enforcing the power of the ordinary screw or screws I expect to accomplish much greater speed than has been heretofore attained.

Having thus described my invention, what I claim as new, and desire to secure by Letters Patent, is—

In a boat or vessel, the combination, with a propeller on each side and one at the stern, of the shafts $f e f$, having cranks transversely aligned and connected by a rod, $c$, whereby all three propellers will operate synchronously and co-operate in each movement of the vessel.

JOHN GARTNER.

Witnesses:
T. S. MILLER,
ALFRED H. BENNERS.